United States Patent
Shirolkar et al.

(10) Patent No.: US 11,886,916 B2
(45) Date of Patent: Jan. 30, 2024

(54) SYSTEM FOR ADAPTIVE MULTITHREADED RECALCULATION OPERATIONS

(71) Applicant: Microsoft Technology Licensing, LLC, Redmond, WA (US)

(72) Inventors: Prashant Anand Shirolkar, Kirkland, WA (US); Bradley Scott Prugar, Peoria, AZ (US); Jeffrey James Duzak, Redmond, WA (US); Qusai Bassam Saleam Al-Rabadi, Woodinville, WA (US); Chae Seong Lim, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 16/916,650

(22) Filed: Jun. 30, 2020

(65) Prior Publication Data
US 2021/0406080 A1    Dec. 30, 2021

(51) Int. Cl.
*G06F 9/46*     (2006.01)
*G06F 9/50*     (2006.01)
(Continued)

(52) U.S. Cl.
CPC .......... *G06F 9/5027* (2013.01); *G06F 9/3009* (2013.01); *G06F 9/5066* (2013.01);
(Continued)

(58) Field of Classification Search
None
See application file for complete search history.

(56) References Cited

U.S. PATENT DOCUMENTS 5,276,607 A    1/1994    Harris et al.
5,535,393 A    7/1996    Reeve et al.
(Continued)

FOREIGN PATENT DOCUMENTS

EP    1152331 A2    11/2001
GB    2394333 A     4/2004
(Continued)

OTHER PUBLICATIONS

"Decisioneering Announces CB Turbo for Crystal Ball, Industry's First Distributed Spreadsheet Analysis Engine", Retrieved from: http://web.archive.org/web/20060530005641/http://www.crystalball.com/press/press_cbt10.html, May 30, 2006, 2 Pages.
(Continued)

*Primary Examiner* — Bing Zhao
(74) *Attorney, Agent, or Firm* — Schwegman Lundberg Woessner, P.A.

(57) ABSTRACT

A method may include receiving an indication that a recalculation operation is to be completed for data stored in a data file; determining that a currently assigned number of threads for execution of the recalculation operation is lower than a target number of threads for the recalculation operation; requesting an additional thread for execution of the recalculation operation; beginning execution of the recalculation operation using the currently assigned number of threads; receiving an indication that the additional thread is available for execution of the recalculation operation; updating the currently assigned number of threads to include the additional thread; and continuing execution of the recalculation operation using the updated currently assigned number of threads.

15 Claims, 7 Drawing Sheets

(51) Int. Cl.
*G06F 40/18* (2020.01)
*G06F 9/30* (2018.01)

(52) U.S. Cl.
CPC ........ *G06F 40/18* (2020.01); *G06F 2209/508* (2013.01); *G06F 2209/5018* (2013.01)

(56) References Cited

U.S. PATENT DOCUMENTS

| | | | |
|---|---|---|---|
| 5,694,603 | A | 12/1997 | Reiffin |
| 5,862,400 | A | 1/1999 | Reed et al. |
| 5,913,925 | A | 6/1999 | Kahle et al. |
| 5,943,663 | A | 8/1999 | Mouradian |
| 5,970,506 | A | 10/1999 | Kiyan et al. |
| 6,055,548 | A | 4/2000 | Comer et al. |
| 6,138,130 | A | 10/2000 | Adler et al. |
| 6,205,465 | B1 | 3/2001 | Schoening et al. |
| 6,304,866 | B1 | 10/2001 | Chow et al. |
| 6,330,661 | B1 | 12/2001 | Torii et al. |
| 6,349,295 | B1 | 2/2002 | Tedesco et al. |
| 6,389,446 | B1 | 5/2002 | Torii |
| 6,430,584 | B1 | 8/2002 | Comer et al. |
| 6,560,606 | B1 | 5/2003 | Young |
| 6,795,845 | B2 | 9/2004 | Kalafatis et al. |
| 6,934,910 | B2 | 8/2005 | Lange et al. |
| 6,957,191 | B1 | 10/2005 | Belcsak et al. |
| 7,010,779 | B2 | 3/2006 | Rubin et al. |
| 7,363,626 | B2 * | 4/2008 | Koutharapu ............ G06F 9/505 709/224 |
| 7,454,595 | B1 | 11/2008 | Pedretti |
| 7,533,139 | B2 | 5/2009 | Jones et al. |
| 8,032,821 | B2 | 10/2011 | Duzak et al. |
| 2001/0056440 | A1 | 12/2001 | Abramson et al. |
| 2002/0184261 | A1 | 12/2002 | Yamane et al. |
| 2002/0198888 | A1 | 12/2002 | Young |
| 2003/0014473 | A1 | 1/2003 | Ohsawa et al. |
| 2003/0106040 | A1 | 6/2003 | Rubin et al. |
| 2003/0167389 | A1 | 9/2003 | Soltis, Jr. et al. |
| 2003/0233313 | A1 | 12/2003 | Bartolucci |
| 2004/0103366 | A1 | 5/2004 | Peyton-jones et al. |
| 2004/0139433 | A1 | 7/2004 | Blythe et al. |
| 2004/0148603 | A1 | 7/2004 | Baylis et al. |
| 2004/0194074 | A1 | 9/2004 | Shibayama et al. |
| 2004/0210822 | A1 | 10/2004 | Kotler et al. |
| 2004/0249852 | A1 | 12/2004 | Aureglia et al. |
| 2004/0255238 | A1 | 12/2004 | Bushel et al. |
| 2005/0050088 | A1 | 3/2005 | Kotler et al. |
| 2005/0267853 | A1 | 12/2005 | Netz et al. |
| 2006/0069993 | A1 | 3/2006 | Jones et al. |
| 2006/0117246 | A1 | 6/2006 | Bauchot et al. |
| 2006/0129929 | A1 | 6/2006 | Weber et al. |
| 2006/0282839 | A1 | 12/2006 | Hankins et al. |
| 2007/0260667 | A1 | 11/2007 | Duzak et al. |
| 2021/0208944 | A1 * | 7/2021 | Mitra .................... G06F 9/5055 |

FOREIGN PATENT DOCUMENTS

| | | |
|---|---|---|
| JP | H0744629 A | 2/1995 |
| JP | H08235266 A | 9/1996 |
| JP | 2001216463 A | 8/2001 |
| JP | 2001318798 A | 11/2001 |
| JP | 2006092519 A | 4/2006 |
| WO | 2007145742 A3 | 2/2008 |

OTHER PUBLICATIONS

"Office Action Issued in European Patent Application No. 05105810.5", dated Dec. 14, 2012, 5 Pages.
"Office Action Issued in European Patent Application No. 05105810.5", dated Jun. 12, 2008, 7 Pages.
"Office Action Issued in European Patent Application No. 05105810.5", dated Oct. 19, 2009, 7 Pages.
"Search Report Issued in European Patent Application No. 05105810.5", dated Mar. 17, 2008, 3 Pages.
"Office Action Issued in Indian Patent Application No. 06017/CHENP/2008", dated Jul. 18, 2016, 7 Pages.
"Office Action Issued in European Patent Application No. 07815088.5", dated Nov. 27, 2015, 4 Pages.
"Supplemental Search Report Issued in European Application No. 07815088.5", dated Dec. 14, 2010, 6 Pages.
"Non Final Office Action Issued in U.S. Appl. No. 10/951,576", dated Jul. 19, 2007, 4 Pages.
"Non Final Office Action Issued in U.S. Appl. No. 10/951,576", dated Feb. 1, 2007, 5 Pages.
"Non Final Office Action Issued in U.S. Appl. No. 10/951,576", dated Aug. 1, 2008, 6 Pages.
"Notice of Allowance Issued in Korean Patent Application No. 10-2005-0054971", dated Aug. 28, 2012, 4 Pages.
"Office Action Issued in Korean Patent Application No. 10-2005-0054971", dated Dec. 23, 2011, 5 Pages.
"Office Action Issued in Korean Patent Application No. 10-2008-7029806", dated Jun. 26, 2013, 5 Pages.
"Final Office Action Issued in U.S. Appl. No. 11/430,486", dated Feb. 19, 2010, 21 Pages.
"Non Final Office Action Issued in U.S. Appl. No. 11/430,486", dated Jul. 13, 2009, 30 Pages.
"Office Action Issued in Indian Patent Application No. 1594/DEL/2005", dated Feb. 25, 2015, 3 Pages.
"Office Action Issued in Canadian Patent Application No. 2,875,086", dated Jan. 21, 2015, 4 Pages.
"First Office Action Issued in Chinese Patent Application No. 200510089360.4", dated May 16, 2008, 9 Pages.
"Second Office Action Issued in Chinese Patent Application No. 200510089360.4", dated Oct. 24, 2008, 8 Pages.
"Third Office Action Issue in Chinese Patent Application No. 200510089360.4", dated Feb. 20, 2009, 10 Pages.
"Notice of Allowance Issued in Japanese Patent Application No. 2005-184988", dated Jun. 15, 2012, 6 Pages.
"Office Action Issued in Japanese Patent Application No. 2005-184988", dated Nov. 18, 2011, 3 Pages.
"Office Action Issued in Japanese Patent Application No. 2005-184988", dated Mar. 29, 2011, 6 Pages.
"Office Action Issued in Australian Patent Application No. 2007259398", dated Sep. 6, 2011, 2 Pages.
"Office Action Issued in Chinese Patent Application No. 200780016503.6", dated Mar. 10, 2010, 10 Pages.
"Office Action Issued in Japanese Patent Application No. 2009-509832", dated Mar. 30, 2012, 8 Pages.
Abramson, et al., "ActiveSheets: Super-Computing with Spreadsheets", In Proceedings of the Advanced Simulation Technologies Conference on High Performance Computing Symposium, Apr. 22, 2001, 6 Pages.
Andrews, et al., "OS/2 Gets Lean and Mean", In Journal of Byte, vol. 19, No. 8, Aug. 1994, 3 Pages.
Balakrishnan, et al., "Manufacturing Cell Formation Using Spreadsheets: Formulation and Comparison", In Proceedings of the 23rd Annual Meeting of the Western Decision Sciences Institute, Mar. 29, 1994, pp. 769-771.
Baumann, Knut, "Accord for Excel", In Journal of Chemical Information and Computer Sciences vol. 37, No. 2, Mar. 24, 1997, pp. 413-414.
Berghaus, Nona, "Teach Spreadsheet Proficiency with Personal Money Management Projects", In Journal of the International Society for Technology in Education, Apr. 1990, 3 Pages.
Beynon, et al., "Programming Principles for Visualization in Mathematical Research", In Proceedings of the 1st International Conference on Computational Graphics and Visualization Techniques, vol. 91, Sep. 16, 1991, 17 Pages.
Bland, C.J., "Using Spread-Sheet Software for Radiometric Spectral Analysis", In Applied Radiation and Isotopes, vol. 47, No. 9, Sep. 1996, pp. 895-898.
Brown, Angusm., "A Methodology for Simulating Biological Systems Using Microsoft Excel", In Journal of Computer Methods and Programs in Biomedicine, vol. 58, No. 2, Feb. 1999, pp. 181-190.

(56) References Cited

OTHER PUBLICATIONS

Brown, Angusm., "Simulation of Axonal Excitability Using a Spreadsheet Template Created in Microsoft Excel", In Journal of Computer Methods and Programs in Biomedicine, vol. 63, No. 1, Sepember, 2000, pp. 47-54.
Burke, AndrewF., "A Method for the Analysis of High Power Battery Designs", In Proceedings of the 32nd Intersociety Energy Conversion Engineering Conference, vol. 4, Jul. 27, 1997, pp. 2252-2257.
Byington, Ian, "Statistics Spreadsheets for School Sports Teams", In a Newsletter of the International Society for Technology in Education, Nov. 1990, 4 Pages.
Cahill, Miles B., "Teaching Chain-Weight Real GDP Measures", In Journal of Economic Education, vol. 34, No. 3, Jan. 2003, pp. 224-234.
Chains, Markov, "Search Process Evaluation for a Hierarchical Menu System", In Proceedings of the International Society for Optical Engineering, Aug. 21, 2001, pp. 183-192.
Chan, Bo, "Defects in Silicon Solar Cell Materials", In a Thesis Submitted to University of New South Wales, Mar. 1993, 317 Pages.
Chen, et al., "NDC++: An Approach to Concurrent Extension of C++", In Journal of ACM SIGPLAN Notices, vol. 32 Issue 3, Mar. 1997, pp. 50-56.
Chi, Ed Haui-Hsin, "A Framework for Information Visualization Spreadsheets (User Interface)", In a Thesis Submitted to the Faculty of the Graduate School of the University of Minnesota, Mar. 1999, 164 Pages.
Chi, et al., "A Spreadsheet Approach to Infonnation Visualization", In Proceedings of the IEEE Symposium on Information Visualization, Oct. 20, 1997, pp. 17-24.
Clarke, R., "Module Interconnection Frameworks for a Real-Time Spreadsheet", RTWware Inc Durham NC, Oct. 19, 1993, 60 Pages.
Clarkson, Barnard, "Spreadsheets Are a Language Too! 2 or a Step by Step Teaching Strategy for Spreadsheets", In Journal of Information Technology and Learning, Dec. 1990, 5 Pages.
Collins, et al., "Epidemiologic Model of Paratuberculosis in Dairy-Cattle", In Journal of Preventive Veterinary Medicine, vol. 11, Oct. 1991, pp. 131-146.
Collins, et al., "Simulation-Model of Paratuberculosis Control in a Dairy-Herd", In Journal of Preventive Veterinary Medicine, vol. 14, No. 1, Oct. 1992, pp. 21-32.
Galletta, et al., "An Experimental Study of Spreadsheet Presentation and Error Detection", In Proceedings of the 29th Annual Hawaii International Conference on System Sciences, vol. 2, Jan. 3, 1996, pp. 336-345.
Gaul, et al., "A Simple Calculation for the Buildup and Decay of Radon Progeny", In Book on Health Physics 80.6, Jun. 2001, pp. 616-617.
Gaylarde, et al., "A Theoretical Model Describing the Influence of Diffusion on Microbicidal Action in Biofilms", In Journal of Revista de Microbiologia, vol. 27, 1996, 5 Pages.
Grama, et al., "Principles of Parallel Algorithm Design", In Book of Introduction to Parallel Computing, Second Edition, 2003, 39 Pages.
Haley, Sue, "AppleMgr: A Prototype Decision Aid for Apple Pest Management, ProQuest Info & Learning", In a Thesis Submitted to Oregon State University, Mar. 9, 1990, 135 Pages.
Haney, et al., "The Optimized NIF Laser System Based on ICF Target Requirements", In Proceedings of the 2nd International Conference on Solid State Lasers for Application to Inertial Confinement Fusion, Oct. 22, 1996, pp. 546-559.
Heckman, et al., "Software for Real-Time Control of a Tidal Liquid Ventilator", In Journal on Biomedical Instrumentation and Technology, vol. 33, No. 3, May 1999, pp. 268-276.
Herter, Gerald, "Two Spreadsheet Productivity Packages", In Journal of Computers in Accounting, Jul. 1992, 5 Pages.
Holdich, R., "Simulation of Compressible Cake Filtration", In Journal of Filtration & Separation, vol. 31, Issue 8, Dec. 1994, pp. 825-806.
Kalogirou, Soteris, "Economic Analysis of Solar Energy Systems Using Spreadsheets", In Journal of Renewable Energy, vol. 9, Issue 1-4, Sep. 1996, 8 Pages.
Keasler, Terrill R., "Applying Computer Technology in a Financial Management: An Example of the Amortization Schedule", In International Journal of Computer Applications in Technology, vol. 13, No. 3-5, Jan. 1, 2000, pp. 93-97.
Lee, et al., "Physics Design and Scaling of Elise", In Journal of Fusion Engineering and Design, vol. 32-33, Nov. 1996, pp. 323-335.
Leopold, et al., "A User Interface for the Visualization and Manipulation of Arrays", In Proceedings of the IEEE Symposium on Visual Languages, Sep. 3, 1996, pp. 54-55.
Levoy, Marc, "Spreadsheets for Images", In Proceedings of the 21st Annual Conference on Computer Graphics and Interactive Techniques, Jul. 24, 1994, pp. 139-146.
Luther, et al., "Alchemi: A .NET-based Grid Computing Framework and its Integration into Global Grids", In Technical Report on GRIDS-TR-2003-8, 2003, 17 Pages.
Mchugh, et al., "An Excel-based Model ofCa2+ Diffusion and Fura 2 Measurements in a Spherical Cell", In American Journal of Physiology—Cell Physiology vol. 286, No. 2, Feb. 2004, 7 Pages.
Minami, Yoshiaki, "Parallel Spreadsheet Processing", In Japan Advanced Institute of Science and Technology, Hokuriku, Feb. 15, 1994, 4 Pages.
Mittermeir, et al., "Finding High-Level Structures in Spreadsheet Programs", In Proceedings of IEEE Ninth Working Conference on Reverse Engineering, Oct. 29, 2002, 12 Pages.
Morely, et al., "Impedance-Based Power-system Analysis Using a Spreadsheet", In Proceedings of the IEEE Industry Applications Society Annual Meeting, Oct. 7, 1990, pp. 1413-1420.
Morishita, Etsuo, "Spreadsheet Fluid Dynamics", In Journal of Aircraft, vol. 36, No. 4, Jul. 1999, pp. 720-723.
Mu, et al., "An Architecture and Prototype Interface for an Online Statistical Table Browser", In Proceedings of the 64th ASIST Annual Meeting, vol. 38, Nov. 3, 2001, pp. 156-170.
Mundkur, Siddharth Dinesh., "Separation Process Synthesis: A Knowledge-Based System Using Spreadsheet/Macros", In Doctoral Dissertation Submitted to the Faculty of the Graduate School of University of Louisville, Jul. 1995, 153 Pages.
"Office Action Issued in Mexican Patent Application No. MX/a/2008/014241", dated Jun. 17, 2010, 6 Pages.
"Office Action Issued in Mexican Patent Application No. MX/a/2008/014241", dated Feb. 1, 2011, 7 Pages.
Nadiminti, et al., "ExcelGrid: A .NET Plug-in for Outsourcing Excel Spreadsheet Workload to Enterprise and Global Grids", In Proceedings of the 12th International Conference on Advanced Computing and Communication, Dec. 15, 2004, 9 Pages.
Ottinger, Thomas Patrick., "Conceptual and Procedural Learning in First-Year Algebra Using Graphing Calculators and Computers", In a Dissertation Thesis Submitted to the Department of Curriculum and Instruction in the College of Education, Georgia State University, 1993, 186 Pages.
Padawitz, Peter, "Swinging Data Types- Syntax, Semantics, and Theory", In Proceedings of the 11th Workshop on Specification of Abstract Data Types Joint with the 8th COMPASS Workshop on Recent Trends in Data Type Specification, Sep. 19, 1995, pp. 409-435.
Parow, Ketil, "Designing a Horn Loudspeaker", In Journal of Electronic World and Wireless World, Jan. 1996, pp. 12-17.
"International Search Report and Written Opinion Issued in PCT Application No. PCT/US2007/011189", dated Jan. 4, 2008, 10 Pages.
"Office Action Issued in Malaysian Patent Application No. PI 20084046", dated Apr. 15, 2014, 3 Pages.
Pinero Mendez, Mayra I.., "Development of Cost Models for Electronics Assemblies", In Thesis Submitted in Partial Fulfillment of the Requirements for the Degree of Master of Science in Industrial Engineering, University of Puerto Rico, May 25, 2001, 448 Pages.
Pountian, Dick, "Starting with a Clean Sheet", In Journal of Byte, vol. 19, No. 11, Nov. 1994, 5 Pages.

(56) References Cited

OTHER PUBLICATIONS

Robert, et al., "Convergence Controls for MCMC Algorithms, with Applications to Hidden Markov Chains", In Journal of Statistical Computation and Simulation, vol. 64, Issue 4, Nov. 1999, pp. 327-355.

Ruddle, AR., "Benefits of General Purpose Mathematical Software in Modelling Electronic Systems", In IEE Colloquium on the Use of Systems Analysis and Modelling Tools: Experiences and Applications, Mar. 20, 1998, 8 Pages.

Saariluoma, et al., "Transforming Verbal Descriptions into Mathematical Formulas in Spreadsheet Calculation", In International Journal of Human-Computer Studies, vol. 41, Issue 6, Dec. 1994, pp. 915-948.

Salmi, et al., "CRISY: A Critical Assemblies Documentation System", In Journal of the Nuclear Societies of Israel, Dec. 1990, 2 Pages.

Sathaye, et al., "A Comprehensive Mitigation Assessment Process (COMAP) for the Evaluation of Forestry Mitigation Options", In Journal of Biomass and Bioenergy vol. 8, No. 5, Jan. 1995, pp. 345-356.

Scoville, Richard, "Spreadsheets. A Total of One (Windows 95)", In Journal of PC World, vol. 3, No. 10, Oct. 1995, 3 Pages.

Seppala, et al., "Rough Modeling of Logistics Networks", In Journal of Integrated Manufacturing Systems, vol. 6, No. 5, Oct. 1, 1995, 10 Pages.

Sheriff, Steven D., "Forward Modeling of Electrical Sounding Experiments Using Convolution and a Spreadsheet", In Journal of Computers & Geosciences, vol. 18, No. 1, Jan. 1992, pp. 75-78.

Spenke, et al., "InfoZoom: Analysing Formula One Racing Results with an Interactive Data Mining and Visualisation Tool", In Proceedings of the 2nd International Conference on Data Mining, Jul. 5, 2000, 11 Pages.

Stent, et al., "Dynamic Simulation Modeling on a Spreadsheet", In Journal of Simulation, vol. 64, No. 6, Jun. 1995, pp. 373-379.

Tetewsky, Avram K., "GUI Development for Real-Time Applications", In Dr. Dobb's Journal, vol. 9, No. 6, Jun. 1994, 7 Pages.

Towler, et al., "Spreadsheet Determines Hyperbolic-Decline Parameters", In Journal of Oil and Gas, vol. 92, No. 11, Mar. 14, 1994, 4 Pages.

Trahan, et al., "An Improved Method for Design of Recursive Digital Filters Using Optimization", In Journal of Digital Signal Processing vol. 5, No. 3, Jul. 1995, pp. 167-175.

Usuda, et al., "Computer-Simulation with Spreadsheet to Analyze Crystalline Structure in Phase Change Recording Layer by Fractal Theory", In Proceedings of the 5th International Symposium on Optical Storage, May 22, 2000, pp. 104-107.

Walter, et al., "A Spreadsheet Method for Studying Neural Networks", In Proceedings of the Symposium on Applied Computing, Apr. 5, 1990, pp. 42-44.

Wang, et al., "Loop Selection for Thread-Level Speculation", In International Workshop on Languages and Compilers for Parallel Computing, Nov. 2, 2006, 15 Pages.

Wu, Sheng-Nan, "Simulations of the Cardiac Action Potential Based on the Hodgkin-Huxley Kinetics with the Use of Microsoft Excel Spreadsheets", In Chinese Journal of Physiology vol. 47, No. 1, Mar. 2004, pp. 15-22.

Zaghloul, Nabil A., "Unsteady Gradually Varied Flow in Circular Pipes with Variable Roughness", In Journal on Advances in Engineering Software, vol. 28, Issue 2, Mar. 1997, pp. 115-131.

Caputo et al., "Multithreaded Recalculation in Excel", Retrieved from: https://docs.microsoft.com/en-us/office/client-developer/excel/multithreaded-recalculation-in-excel, Nov. 16, 2014, 10 Pages.

* cited by examiner

SYSTEM FOR ADAPTIVE MULTITHREADED RECALCULATION OPERATIONS

CROSS-REFERENCE TO RELATED APPLICATIONS

This patent application is related to U.S. Pat. No. 7,533,139 (Method and System for Multithread Processing of Spreadsheet Chain Calculations), filed Sep. 27, 2004, and U.S. Pat. No. 8,032,821 (Multi-thread Spreadsheet Processing with Dependency Levels), filed May 8, 2006, both of which are hereby incorporated by reference in their entirety.

BACKGROUND

Documents created by spreadsheet applications often include formulas in a first cell that rely on a value of a second cell. Accordingly, when a cell value is changed in the second cell, the formula in the first cell should be recalculated. For more complex spreadsheets, these recalculations may involve thousands of recalculations. Recalculations may also occur when opening a document, when manually requested by a user, or when a user copy and pastes formulas.

In order to speed up the recalculations, the spreadsheet application may take advantage of multiple available execution threads. In doing so, the recalculation operations may be completed in a fully, or semi-fully, parallel manner.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, etc.) accessible by the component via an application programming interface (API) or other program communication method. Similarly, the variables may be assumed to have default values should a specific value not be described. User interfaces may be provided for an end-user or administrator to edit the variable values in some instances.

As used herein, a recalculation operation is often discussed as a singular operation, however, a recalculation operation may include many calculations for a number of cells—in some instances multiple calculations per cell—in a spreadsheet document based on iterating through one or more dependency chains. Similarly, although the recalculation operation is discussed in the context of a spreadsheet application, the adaptive multithreading techniques described may be applied to other types of documents in which multiple threads are used.

As indicated above, executing a recalculation operation using multiple threads may greatly speed up the time needed to complete the recalculation operation. A thread may be associated with a CPU core in various examples. In some examples, multiple threads may be associated with a single CPU core.

In one scenario, each recalculation operation may use a static number of threads (e.g., four) to complete its calculations. There are potential performance or resource waste downsides to using a static number, however. For example, not all recalculation operations are equal such that the calculation would not need, or fully utilize, four threads. Accordingly, unnecessary context switching may occur for threads that are not being used during a recalculation operation.

Furthermore, the optimal number of threads may change during the recalculation operation. For example, recalculation operations may be performed based upon iterating through a dependency tree (also referred to as a recalculation tree). The dependency tree may map out which cells values need to be calculated before another (e.g., cell AA uses values from cell B1 and cell C1) as a set of dependency chains. Within the recalculation tree there may be individual chains that may be calculated in parallel, whereas other chains require completion of another chain before the other chains can be calculated. Accordingly, sometimes a thread may not be needed because it is waiting on a value to be calculated from another chain.

There are many downsides to over-assigning threads for a recalculation operation. For example, if the threads in a computing device are in heavy use, assigning them to the recalculation operation may result in expensive (in computer resources and performance) context switching as the threads are passed between the recalculation operation and other operations being executed by the computer device. Context switching also results in more CPU cache evictions, which again, may lower overall system performance. Depending on the operating environment, excess context switching may also reduce battery life on client devices.

These problems may become even more acute when a computing device is operating as a cloud-based server executing multiple instances of the spreadsheet application—as well as potentially many other applications. For example, the number of non-active threads would quickly become exhausted should all the instances of the spreadsheet application each request the same number of threads for their respective recalculation operations.

One possible solution is to request a small number of threads (e.g., two) in the beginning and ramp up as execution of the recalculation operation continues. As discussed above, however, eventually the requests may become counterproductive as the utilization rate of the threads increases.

In view of the of the above problems, a system is described herein that adaptively controls the number of threads for a recalculation operation. The adaptive process helps cure the deficiencies of the prior systems by adding and releasing threads on an as-needed basis as well as based on the current performance of the executing computing device. This process may reduce the number of context switches, and therefore increase the overall throughput—and potentially battery life—of the executing computing devices.

The use of a system as described above provides numerous distinctions over existing multithreaded execution solutions. First, there is an intent to change—during runtime—the number of threads for a recalculation operation that is distinct from any system level available thread manager (e.g., run by an operating system). Second, the system may decide when to make the changes to add or remove threads. Finally, the system may determine what metrics (e.g., active threads, thread utilizations, memory use, etc.) to use to determine if a thread should be added or released.

For example, a recalculation operation may request to have four threads initially, but only two may be currently available at the time of the request. The requested number of threads may be considered an initial target number of threads in some examples. The recalculation operation may begin with the two and once the additional two threads are available, those threads may be added to the currently assigned number of threads for the recalculation operation. Additionally, the recalculation operation—at some point during execution—may no longer need four threads (e.g., the target number of threads may decrease) and release them. Further details of this asynchronous, adaptive process are described below.

Figure 1:
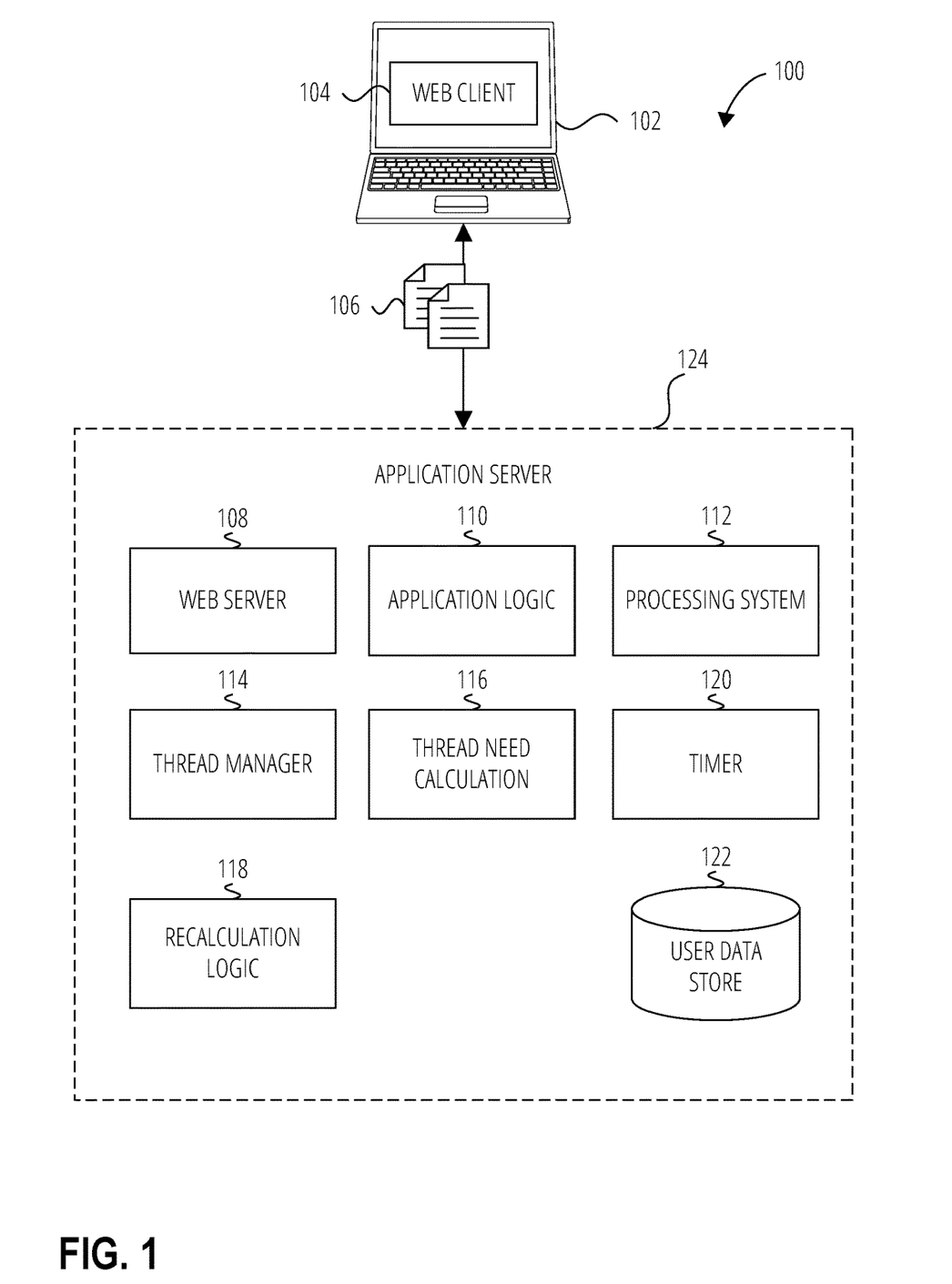
FIG. 1 is a diagram illustrating components in a system for adaptive thread use in a recalculation operation, according to various examples.

FIG. 1 is a diagram illustrating components in system 100 for adaptive thread use in a recalculation operation, according to various examples. System 100 includes client device 102 operating web client 104. Client device 102 may communicate with application server 124 over a network (not shown) with respect to data file 106. In various examples, data file 106 is a spreadsheet document. The document may include entries in one or more cells. An entry value may include a formula that depends on an entry value in another cell.

A computing device (such as client device 102) may be, but is not limited to, a smartphone, tablet, laptop, multiprocessor system, microprocessor-based or programmable consumer electronics, game console, set-top box, or other device that a user utilizes to communicate over a network. In various examples, computing devices includes a display module (not shown) to display information (e.g., in the form of specially configured user interfaces). In some embodiments, computing devices may comprise one or more of a touch screen, camera, keyboard, or microphone.

A network may include local-area networks (LAN), wide-area networks (WAN), wireless networks (e.g., 802.11 or cellular network), the Public Switched Telephone network (PSTN) network, ad hoc networks, cellular, personal area networks or peer-to-peer (e.g., Bluetooth®, Wi-Fi Direct), or other combinations or permutations of network protocols and network types. The network may include a single local area Network (LAN) or wide-area Network (WAN), or combinations of LAN's or WAN's, such as the Internet.

Application server 124, as illustrated, includes web server 108, application logic 110, processing system 112, thread manager 114, thread need calculation 116, recalculation logic 118, timer 120, and user data store 122. Application server 124 is illustrated as set of separate components; however, the functionality of individual components may be performed by a single component. A component may represent computer program code that is executable by a processing unit (e.g., a core of a general purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Furthermore, in various examples, one or more of the components of application server 124 may be part of client device 102. Thus, the adaptive multithreaded recalculation operation may be performed using a local version of the spreadsheet application.

A web server such as web server 108 may be used to exchange information with users via a network such as the Internet. Although generally discussed in the context of delivering webpages via the Hypertext Transfer Protocol (HTTP), other network protocols may be utilized by web servers (e.g., File Transfer Protocol, Telnet, Secure Shell, etc.) A user may enter in a uniform resource identifier (URI) into a web client 104 (e.g., the INTERNET EXPLORER® web browser by Microsoft Corporation or SAFARI® web browser by Apple Inc.) that corresponds to a location (e.g., an Internet Protocol address) associated with web server 108.

In response, web server 108 may transmit a web page that is rendered on a display device of client device 102. Web server 108 may enable a user to interact with one or more web applications represented by application logic 110 provided in a transmitted web page. A web application may provide user interface (UI) components that are rendered on a display device of client device 102. The user may interact (e.g., select, move, enter text into) with the UI components, and, based on the interaction, the web application may update one or more portions of the web page. A web application may be executed in whole, or in part, locally on client device 102. The web application may populate the UI components with data from external sources or web server 108 in various examples. For example, application logic 110 may represent a spreadsheet application that permits the user to create, delete, modify, etc., spreadsheet documents.

Processing system 112 may represent the hardware components that executes instructions for providing the functionality described herein for application server 124. For example, processing system 112 may include one or more cores of a central processing unit. Other examples of processors that may be used in processing system 112 are discussed with respect to processor 504 in FIG. 5. Furthermore, although not depicted in application server 124, application server 124 may include other computing components described in FIG. 5. In various examples, processing system 112 spans multiple physical machines. Accordingly, threads from more than one device may be used, released, or requested, during the recalculation operation.

In various examples, user data store 122 may store data for users of a spreadsheet application (or other application) that is being executed by application server 124. For example, a user may log into the spreadsheet application using a username and password. Upon logging in, spreadsheet documents associated with the username may be presented for selection by the user via web client 104.

Application logic 110 may monitor the actions taken by the user in the spreadsheet application and update values in the spreadsheet document. For example, when a user changes a value in one cell, application logic 110 may determine that another cell needs to be updated (e.g., its value recalculated). As such time, application logic 110 may call recalculation logic 118.

Recalculation logic 118 may be the set of instructions that manage how a recalculation operation is performed. For example, recalculation logic 118 may use thread manager 114, thread need calculation 116, and timer 120 to perform a recalculation operation. An example flowchart of a recalculation operation using recalculation logic 118 is described and depicted in FIG. 2A-FIG. 2C.

Recalculation logic 118 as well as thread manager 114, thread need calculation 116, and timer 120 may be part of application logic 110 in various examples. In other examples, one or more of these components may be part of a thread manger one level above an individual instance of the spreadsheet application. For example, each instance of the spreadsheet application executing on application server 124 may request threads from a common thread manager 114 but each have their own timers.

Thread need calculation 116 may be based on thread utilization rates. For example, consider that there are four asynchronous recalculation threads (e.g., the currently assigned number of threads) for a recalculation operation. In an ideal state, each thread would fully utilize its associated CPU core the entire time during operation for a given dependency level (described below with respect to FIG. 3) of a calculation chain. In an example, thread need calculation 116 may use an operating system API retrieve the CPU clock cycles actually used by a thread at the end of a dependency level in a calculation chain. The actual CPU clock cycles may be divided by the actual clock cycles elapsed to determine a specific thread's utilization rate.

In normal operation, however, it is unlikely that each thread is being used 100% of the time. In a more common scenario, a first thread may finish its chain before a second thread. However, the first thread may not move on to the next dependency level until the second thread has completed its calculation as well. Thus, the first thread must wait. In a worst case example, a recalculation operation loses the benefits of parallelism because only a single thread is active while the other threads wait for it to finish. A thread may also be under-utilized when the larger system (e.g., application server 124) is busy because of context switching in which the thread is not always available to the recalculation operation.

In various examples, an average of thread utilization for all threads may be used to determine if additional threads are needed or if threads may be released. For example, if the average thread utilization is greater than a maximum threshold (e.g., 80%), additional threads may be requested. If the average thread utilization is below some minimum threshold (e.g., 30%), threads may be released.

The number of threads requested or released may be determined in a variety of manners. For example, the requested number of threads may be the same (e.g., one additional thread) each time a request is made, doubling each time a request is made, be based on a set sequence table (e.g., 1, 2, 4, 2), based on the average thread utilization, etc. The number of threads released may be determined in a similar fashion.

Thread need calculation 116 may be based on other factors without departing from the scope of this disclosure. These other factors may include, but are not limited to, application server 124 parameters such as current memory use, temperature, processor usage, etc. Lookup tables or weighted formulas with the values of these factors may be used as part of thread need calculation 116.

In various examples, the total number of threads after a request or release would be completed is considered the target number of threads. In various examples, an initial target number of threads may be stored as a default value. In various examples, the initial target number of threads may be based on a predicted complexity—e.g., the number of values in the dependency tree, the number of levels, etc.—of the recalculation operation.

Figure 2A:
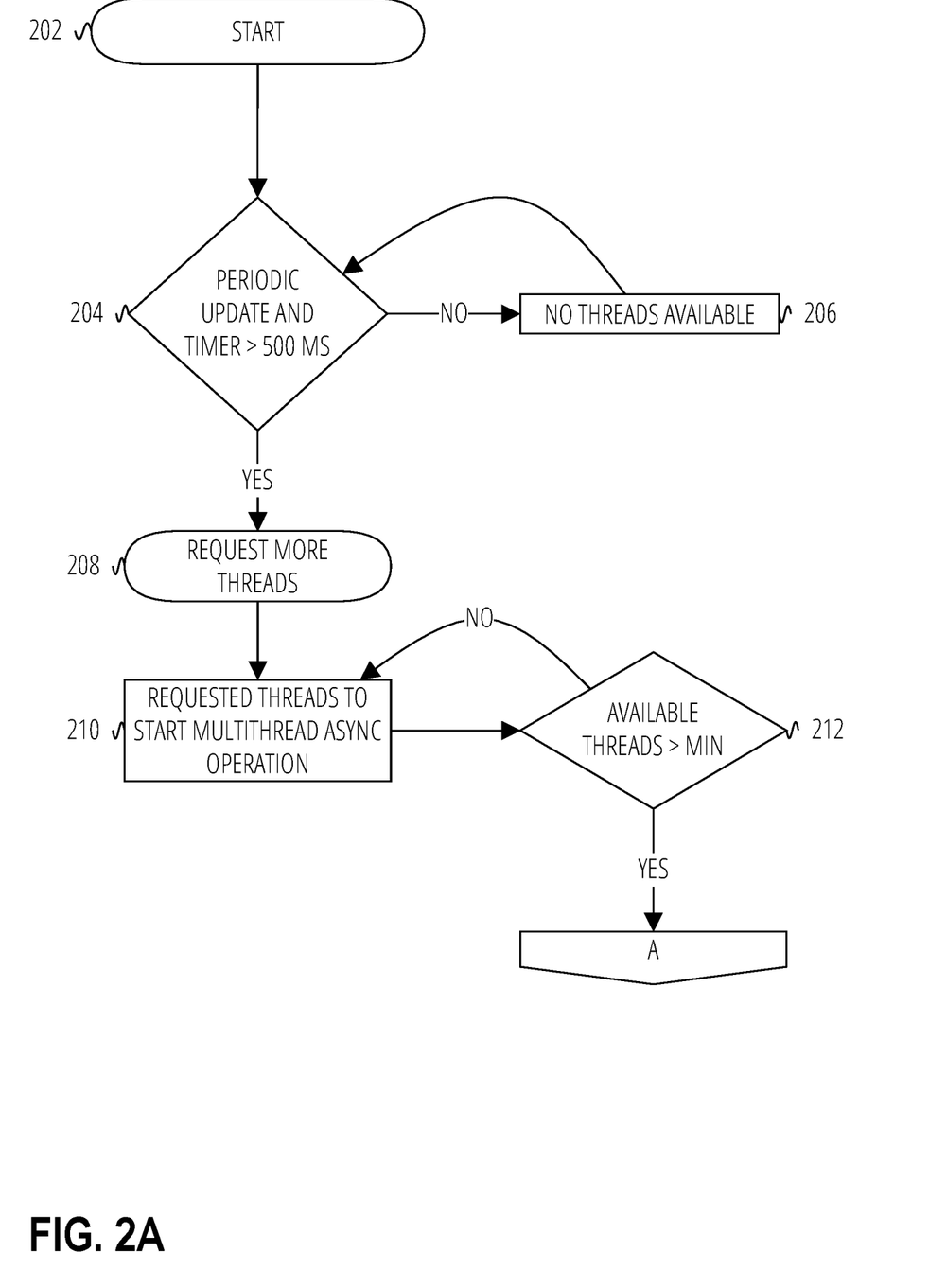
FIG. 2A is a portion of a flowchart that depicts operations in a recalculation operation, according to various examples.

FIG. 2A is an illustration of a portion of a flowchart that depicts operations in a recalculation operation, according to various examples. In various examples, states of execution are depicted as rectangles, conditional decisions are depicted as diamonds, and actions are depicted as ovals. The operations of the flowchart may be implemented using a system such as application server 124, in various examples.

The flowchart begins at start action 202. This action may be triggered once a spreadsheet application determines that a recalculation operation is needed. For example, a cell value may change and therefore a formula that relies on that value may need to be recalculated. At start action 202, the recalculation operation may begin operating on a single thread. At condition check 204, there may be a periodic check to see if a timer has lapsed. In FIG. 2A the length of the timer is 500 ms but other lengths may be used without departing from the scope of this disclosure. In various examples, condition check 204 is executed using thread manager 114.

If the time lapsed is less than the determined timer length, the state is set to state 206 in which no additional threads are available for the recalculation operation since no threads have been requested. During the time the timer is running, the recalculation operation may continue to operate on the single thread.

Once the timer has reached its threshold (e.g., 500 ms) request more threads action 208 is taken in which additional threads are requested for the recalculation operation. Request more threads action 208 may be executed via thread manager 114, in various examples. Thread manager 114 may request assignment of threads using a system call for an operating system of application server 124. Similarly, thread manager 114 may be used to determine if there are threads available for assignment to a recalculation operation at the time the request is made. Note, there may be a delay between the application server 124 receiving the request(s) and availability.

After request more threads action 208, the recalculation operation may be in requested threads state 210. Being in this state does not mean that the recalculation operation may immediately begin using the threads. Accordingly, execution may continue on the single thread when in requested threads state 210. Periodically (e.g., using a timer), condition check 212 may be performed to determine if the number of available threads is greater than a minimum (e.g., two). If not, the timer may reset, and the state may stay in requested threads state 210. An available thread may be a thread that is available for immediate use by recalculation operation as opposed to a thread that exists within processing system 112. In various examples, thread manager 114 identifies whether or not a thread is available for the recalculation operation.

Figure 2B:
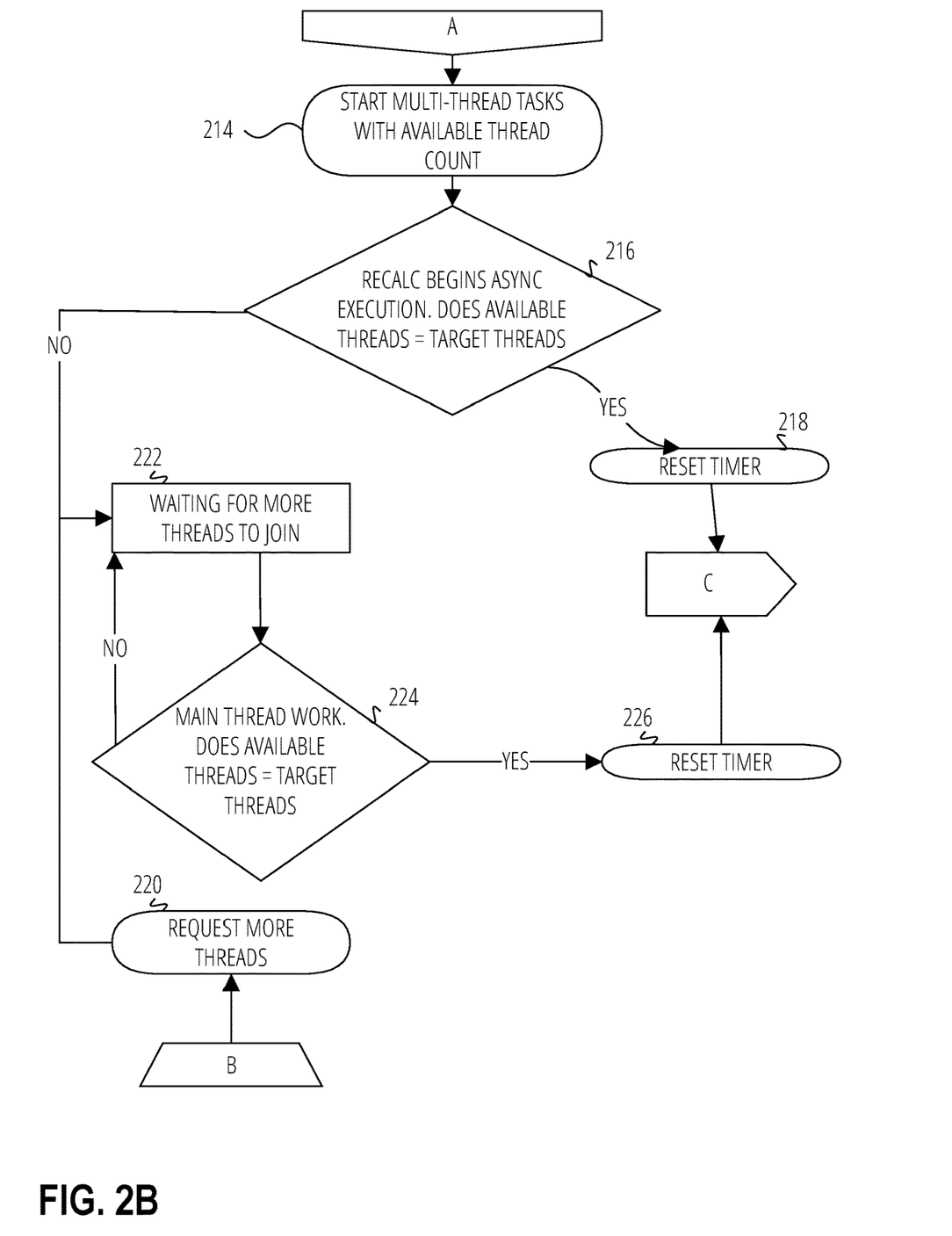
FIG. 2B is a portion of a flowchart that depicts operations in a recalculation operation, according to various examples.

Once it is determined that condition check 212 is satisfied, the process may enter into asynchronous multithreaded execution of the recalculation operation in FIG. 2B.

FIG. 2B is an illustration of a portion of a flowchart that depicts operations in a recalculation operation, according to various examples. After beginning asynchronous multithreaded execution with whatever threads are available (action 214), available thread check 216 may be performed by thread manager 114. More specifically, it may be determined if the currently assigned number of threads (as determined by thread manager 114) is equal to a target number of threads (e.g., as determined by thread need calculation 116) for the recalculation operation.

Thread need calculation 116 may determine the target number of threads for the recalculation operation. The target number of threads may be based on one or more metrics as discussed previously. It is not always true that adding more threads will increase overall recalculation operation. For example, if the reason for non-completion or slower completion of the recalculation tree is because of the recalculation tree, there may be no benefit in requesting more threads. For similar reasons, the target number of threads may be lower than the currently assigned number of threads.

Figure 2C:
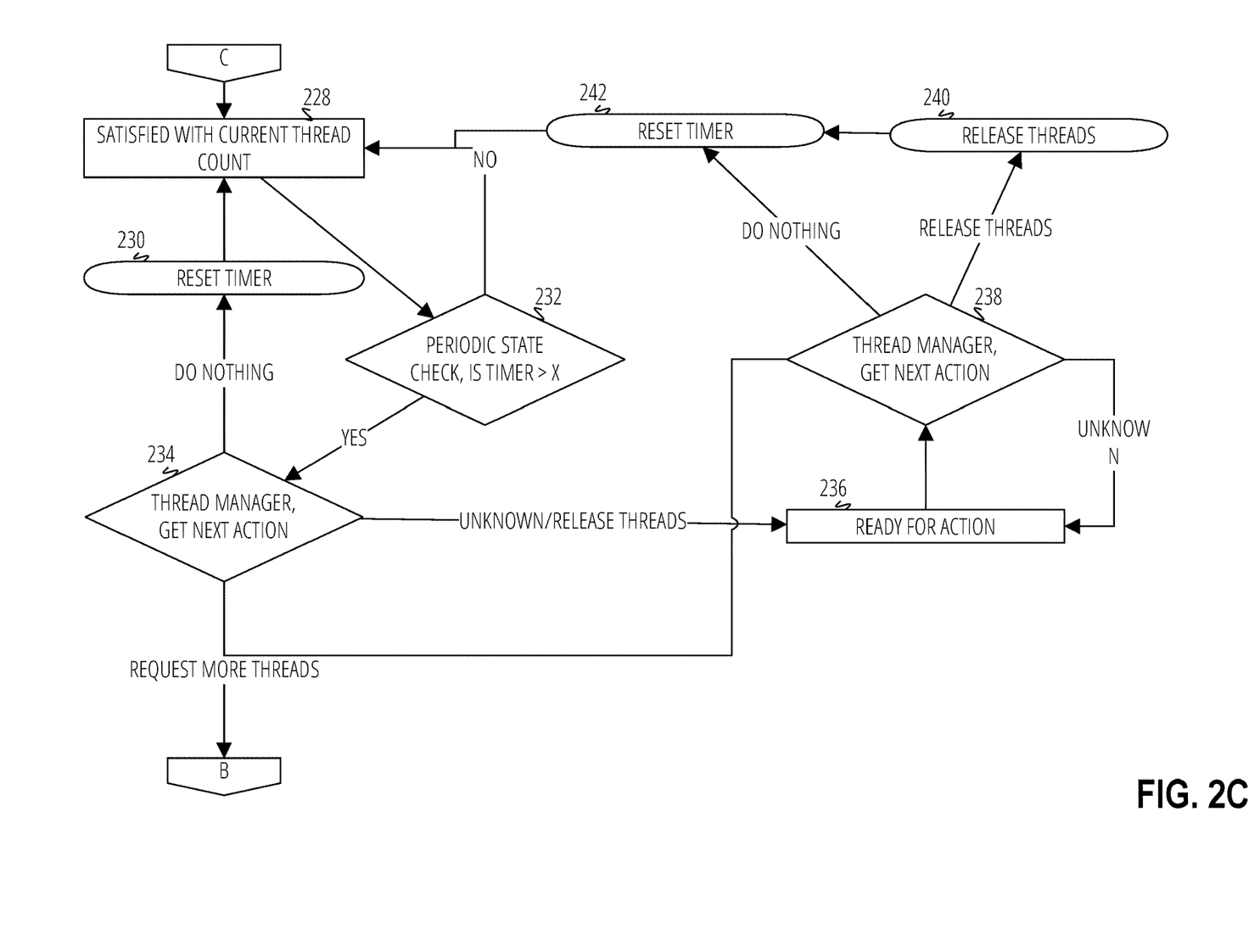
FIG. 2C is portion of a flowchart that depicts operations in a recalculation operation, according to various examples.

If the result of available thread check 216 indicates that the target number of threads is equal to the number of currently assigned number of threads, flow goes to reset timer action 218. A timer (e.g., timer 120) may be used with respect to satisfied state 228 (discussed further as depicted in FIG. 2C) such that periodic state updates may be made. Accordingly, when the target number of threads is equal to the currently assigned number of threads, the timer is reset and the state becomes satisfied state 228. The length of time for timer 120 may be stored as a variable in application logic 110.

If the target number of threads is less than the available number of threads, flow goes to waiting for threads state 222. Waiting for threads state 222 may also be entered based on a request more threads action 220 coming from FIG. 2C as discussed in more detail below. Requesting threads does not mean that the threads are available for the recalculation operation. Accordingly, the recalculation operation may operate using the currently assigned number of threads while in waiting for threads state 222.

The available number of threads (e.g., three) may be greater than the minimum number of threads (e.g., two) discussed in condition check 212, but still less than the target number of threads (e.g., four) In such instances, the recalculation operation may add the available number of threads to its pool of executing threads—also referred to as the currently assigned number of threads—and enter waiting for threads state 222.

Periodically available thread check 224 may be made to determine if there are more available threads for the recalculation operation. If so, they may be added to the pool of executing threads for the recalculation operation. If the currently assigned number of threads is equal to the target number of threads (as determined in available thread check 216) at available thread check 224, flow may continue to reset timer action 226 and then satisfied state 228. If not, any additional available threads may be added to the pool of executing threads for the recalculation operation and waiting for threads state 222 is maintained.

In various examples, a thread may only be added or removed from the pool of executing threads when the multithreaded recalculation operation is paused. A further discussion of when a pause occurs is discussed with respect to FIG. 3 below.

FIG. 2C is an illustration of a portion of a flowchart that depicts operations in a recalculation operation, according to various examples. FIG. 2C continues from FIG. 2B after either reset timer action 218 or reset timer action 226 and begins at satisfied state 228. When in satisfied state 228, the recalculation operation continues using the currently assigned number of threads.

Periodically, state condition check 232 is performed to determine if timer 120 has lapsed. State condition check 232 is performed to determine if enough time has lapsed that another check should be made to determine if the currently assigned number of threads is equal to the target number of threads. Accordingly, thread need calculation 116 may be performed. The result of thread need calculation 116 may be that more threads are needed (request more threads action 220 on FIG. 2C), less threads are needed (ready for action state 236), or the current number of threads is correct in which case reset timer action 230 is performed and satisfied state 228 continues.

State condition check 232 may be performed at the same time the recalculation operation is being performed. Additionally, because certain actions (e.g., release threads) may, in some examples, only be performed while the multithreaded recalculation operation is paused, an "unknown" result may be output from state condition check 232. In such instances, ready for action state 236 may also be entered. A second check at get next action condition 238 may be performed to determine if the multithreaded recalculation operation is in a pause state. Accordingly, the actual release of threads may be deferred until state condition check 232 indicates the multithreaded recalculation operation is in a pause state.

An "unknown" action may also occur if next action condition 234 does not have enough information to determine an action. Instead of waiting for the information, and thereby pausing further checks, flow may continue to ready for action state 236.

In various examples, the results of get next action condition 238 may be to do nothing in which case reset timer action 242 is taken. In instances in which get next action condition 238 indicates the action is still to release threads, release threads action 240 is performed. Release threads action 240 may include lowering the number of currently assigned number of threads to the multithreaded recalculation operation. As indicated previously, release threads action 240 may be performed when the multithreaded recalculation operation is paused. After release threads action 240, operational flow may continue to reset timer action 242 upon which timer 120 is reset. Then, the satisfied state 228 may be entered again.

As discussed above, the actual addition or releasing of threads may occur when the multithreaded recalculation operation is paused. A multithreaded recalculation operation may be paused for a number of reasons. For example, consider a spreadsheet document with the following table:

|   | A    | B    | C       |
|---|------|------|---------|
| 1 | =1   | =1   |         |
| 2 | =A1  | =B1  |         |
| 3 | =A2  | =B2  | =A3 + B3 |

As a single (flat) chain, a calculation chain for C3 may look like C3→B3→B2→B1→A3→A2→A1. If one looks closer, however, it can be seen that the value of A3 and B3 could be calculated independently since none of the dependent values need for calculating A3 overlap with the dependent values needed for B3.

Figure 3:
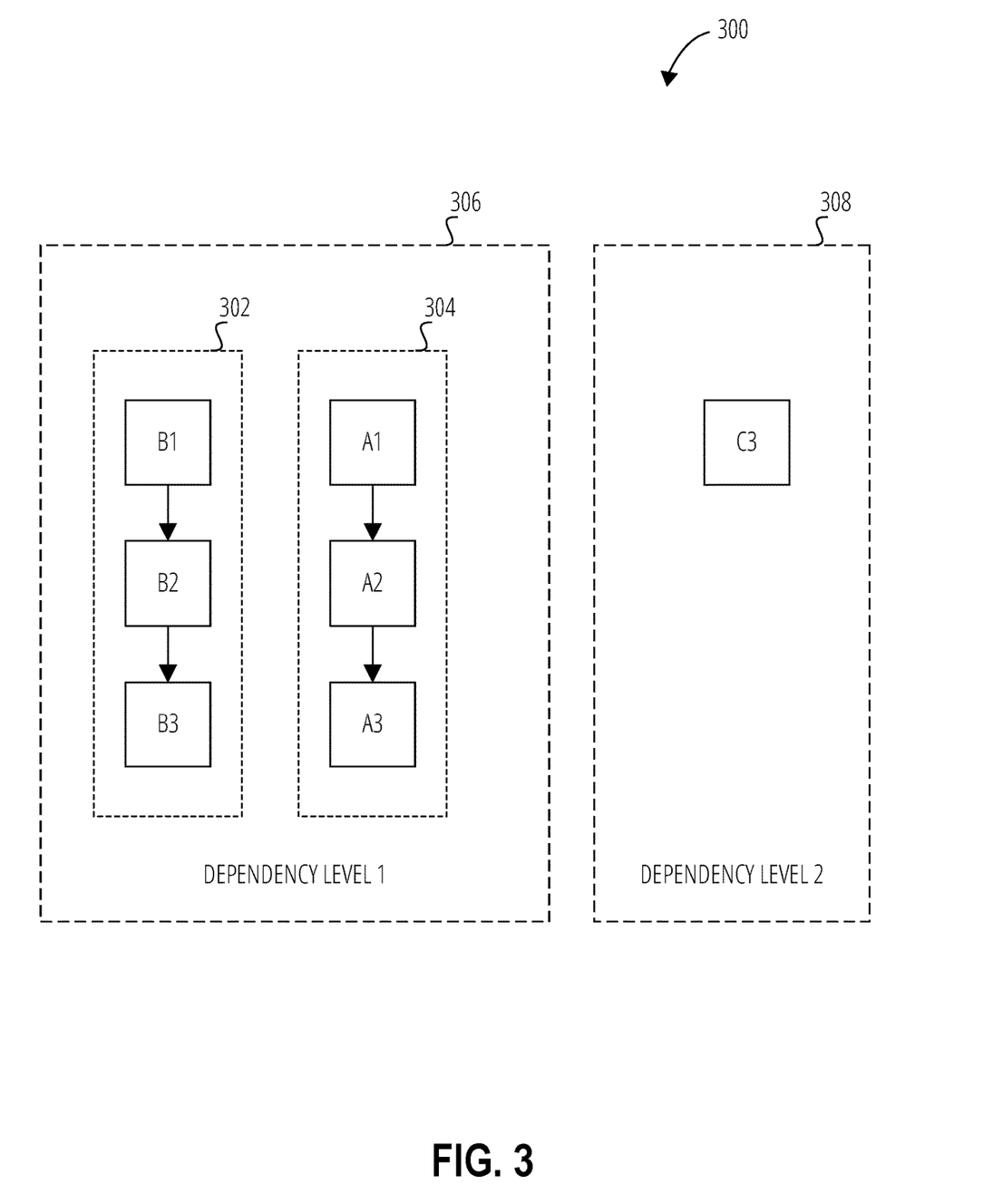
FIG. 3 illustrates a diagram of cell value dependency chains, according to various examples.

FIG. 3 illustrates a diagram 300 of cell value dependencies, according to various examples. As illustrate, FIG. 3 includes child chain 302 and child chain 304 that correspond to the table above. FIG. 3 further illustrates two different dependency levels, first dependency level 306 and second dependency level 308. In various examples child chain 302 and child chain 304 may be calculated independently using separate threads. C3 in second dependency level 308, however, must wait until the calculations are complete in first dependency level 306—even if one thread finishes child chain 302 and is simply waiting.

A count of active threads for a given dependency level may be tracked. As each thread completes a child chain within the dependency level, a check may be made to determine if another child chain can be completed within the same dependency level. If not, the active thread counter may be decremented and the thread may go to sleep. Once, the counter reaches zero, the multithreaded recalculation operation may be paused. After the pause, chains in the next dependency level may begin.

Accordingly, the pause period is a logical time to change the currently assigned number of threads. For example, the next dependency level may not need all of the currently assigned number of threads. Alternatively, the next level may benefit from additional threads. When to add or decrease threads is discussed in the flow diagram of FIG. 2A-FIG. 2C. In some examples, because the threads are operating asynchronously, a request to add more threads may be made in a variety of times—as opposed to waiting for timer 120 to reset at next action condition 234.

Figure 4:
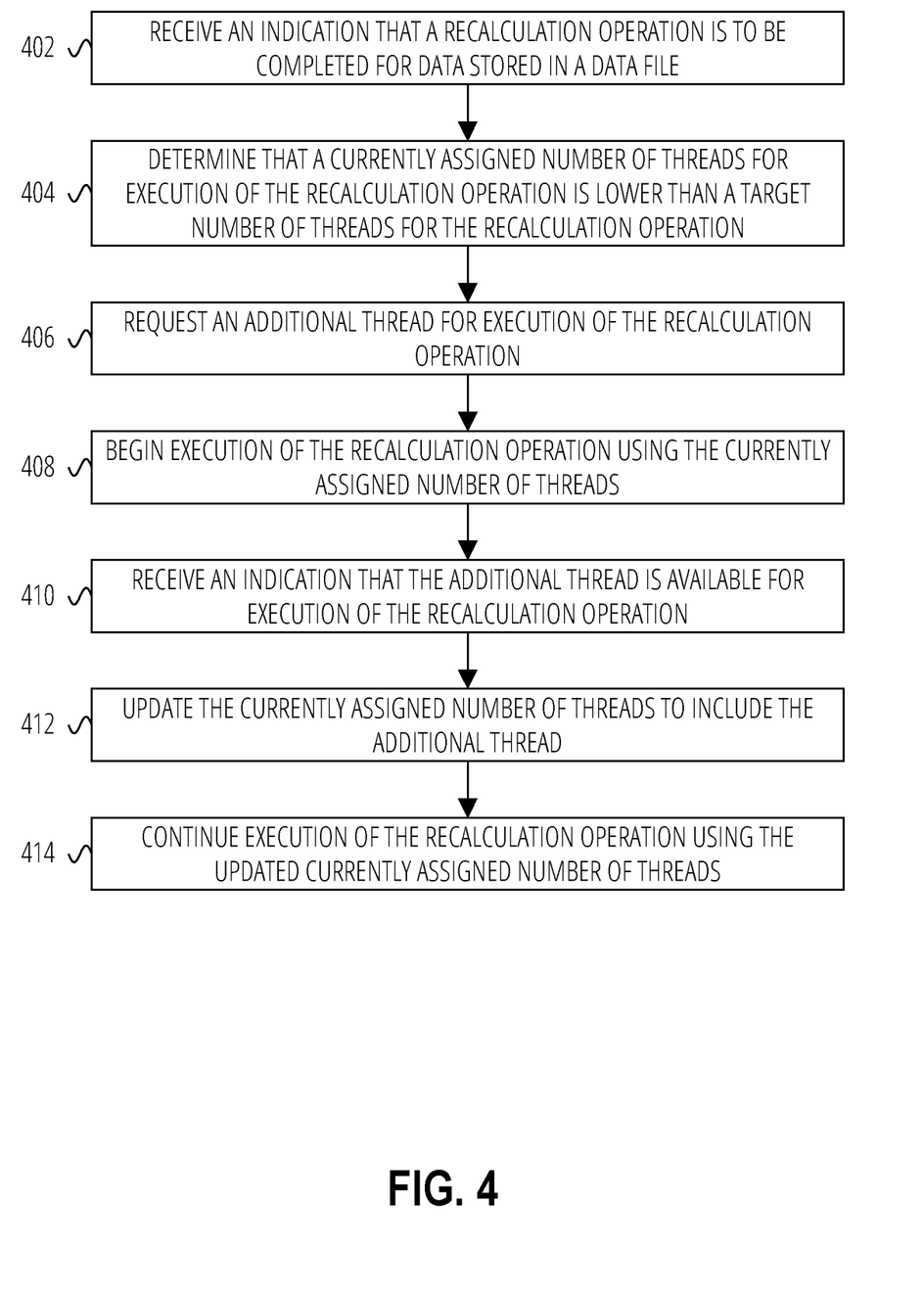
FIG. 4 is a flowchart illustrating operations for an adaptive multithreaded recalculation operation in accordance with various examples.

FIG. 4 is a flowchart illustrating operations for an adaptive multithreaded recalculation operation in accordance with various examples. The method is represented as a set of blocks 402-414 that describe operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, the method is performed using the components depicted in FIG. 1.

In block 402, the method may perform an operation to receive an indication that a recalculation operation is to be completed for data stored in a data file. For example, this block correlate to start action 202 in FIG. 2. The indication may be received by application logic 110 in various examples. In various examples, the data file is a spreadsheet document and the data stored includes formulas in cells of the spreadsheet document. In various examples, the spreadsheet document is associated with a spreadsheet application. The spreadsheet application may be being processed on a server device such as application server 124. The indication may be based on user input (e.g., copy and paste of a formula) within a cell of the spreadsheet document as presented on a client device (e.g., client device 102).

In block 404, the method may perform an operation to determine that a currently assigned number of threads for execution of the recalculation operation is lower than a target number of threads for the recalculation operation. This operation may correspond to available thread check 216 in FIG. 2 in various examples.

In block 406, the method may perform an operation to request an additional thread for execution of the recalculation operation. This operation may correspond to request more threads action 220 or occur after available thread check 216 in various examples. In various examples, more than one thread may be requested. The number requested may be based on the currently assigned number of threads. For example, if there are two threads, two additional threads may be requested. Other incrementing schemes are discussed above.

In block 408, the method may perform an operation to begin execution of the recalculation operation using the currently assigned number of threads. For example, if there are only two threads available, but the target number of threads is four, execution of the recalculation operation may begin with the two available and assigned threads.

In block 410, the method may perform an operation to receive an indication that the additional thread is available for execution of the recalculation operation. In various examples, the indication that the additional thread is available may occur in response to request more threads action 220.

In block 412, the method may perform an operation to update the currently assigned number of threads to include the additional thread. In various examples, the updating may occur after receiving an indication that the thread is available. For example, after waiting for threads state 222. In various examples, the addition of the thread may occur when the recalculation operation is paused.

In block 414, the method may perform an operation to continue execution of the recalculation operation using the updated currently assigned number of threads. This operation may occur in a number of places such as when in satisfied state 228 with respect to FIG. 2C.

In various examples, the target number of threads is periodically updated. For example, the target number of threads may be updated after a timer as lapsed (e.g., during state condition check 232) or when a thread need calculation has been made. In various examples, the updated target number of threads is based on a thread utilization metric (e.g., average thread utilization) of the currently assigned number of threads. The utilization metric (e.g., average thread utilization) may be based on thread utilization during completion of a dependency level in the recalculation operation.

In various examples, when the currently assigned number of threads is greater than the updated target number of threads, a thread may be released of the currently assigned number of threads (e.g., release threads action 240). In various examples, the release of the thread of the currently assigned number of threads is delayed until a pause in execution of the recalculation operation. In various examples, when the currently assigned number of threads is fewer than the updated target number of threads, additional threads are requested for continued execution of the recalculation operation. The recalculation operation, however, may continue executing with its currently assigned number of threads.

Figure 5:
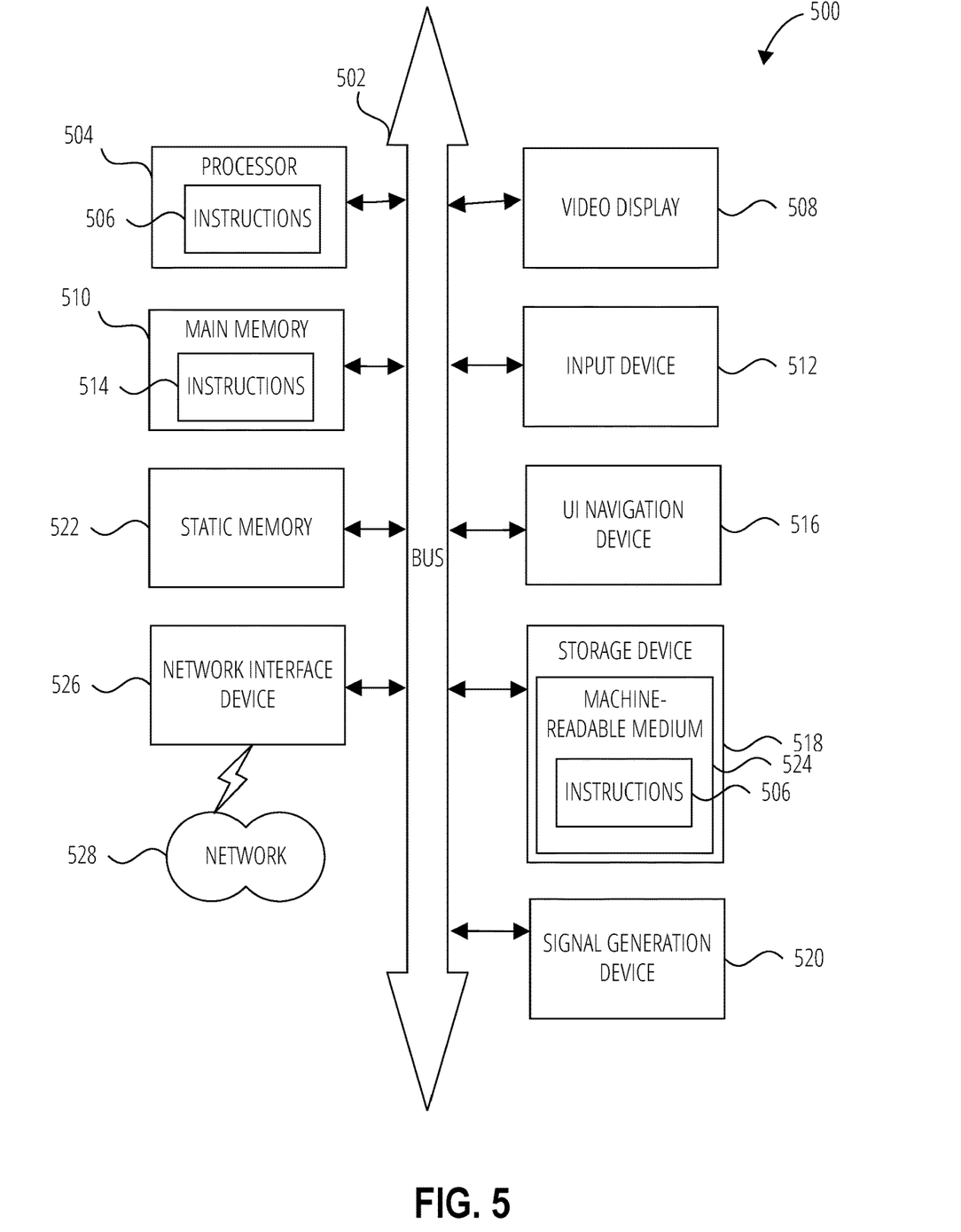
FIG. 5 is a block diagram of a computer system that may be used to perform the functionality described here, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 504 (e.g., a central processing unit (CPU), a graphics processing unit (GPU) or both, processor cores, compute nodes, etc.), a main memory 510 and a static memory 522, which communicate with each other via a bus 502. The computer system 500 may further include a video display 508, an input device 512 (e.g., a keyboard), and a user interface (UI) navigation device 114 (e.g., a mouse). In one embodiment, the video display 508, input device 512, and UI navigation device 516 are incorporated into a single device housing such as a touch screen display. The computer system 500 may additionally include a storage device 518 (e.g., a drive unit), a signal generation device 520 (e.g., a speaker), a network interface device 526, and one or more sensors (not shown), such as a global positioning system (GPS) sensor, compass, accelerometer, or other sensors.

The storage device 518 includes a machine-readable medium 524 on which is stored one or more sets of data structures and instructions 514 (e.g., software) embodying or utilized by any one or more of the methodologies or functions described herein. The instructions 514 may also reside, completely or at least partially, within the main memory 510, static memory 522, and/or within the processor 504 during execution thereof by the computer system 100, with the main memory 510, static memory 522, and the processor 504 also constituting machine-readable media.

While the machine-readable medium 524 is illustrated in an example embodiment to be a single medium, the term "machine-readable medium" may include a single medium or multiple media (e.g., a centralized or distributed Database, and/or associated caches and servers) that store the one or more instructions 514. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 524 that excluded transitory signals.

The instructions 514 may further be transmitted or received over a communications Network 126 using a transmission medium via the network interface device 526 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, 4G LTE/LTE-Am 5G or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A system comprising:
  a processing system;
  a storage device comprising instructions, which when executed by the processing system, cause the processing system to:
  receive an indication that a recalculation operation is to be completed for data stored in a data file;
  determine that a currently assigned number of available threads for execution of the recalculation operation is lower than a target number of threads for the recalculation operation, wherein the target number of threads for the recalculation operation is dynamically determined and periodically updated, by:
    determining a thread utilization metric for each thread in the currently assigned number of available threads, during execution of a current dependency level of the recalculation operation; and
    periodically updating the target number of threads for the recalculation operation based on the determined thread utilization metric for each thread in the currently assigned number of available threads;
  request an additional thread for execution of the recalculation operation;

begin execution of the recalculation operation using the currently assigned number of available threads;
receive an indication that the additional thread is available for execution of the recalculation operation;
update the currently assigned number of available threads to include the additional thread; and
subsequent to the update, continue execution of the recalculation operation using the updated number of threads.

2. The system of claim 1, wherein the data file is a spreadsheet document and the data stored includes formulas in cells of the spreadsheet document.

3. The system of claim 2, wherein the indication is based on user input within a cell of the spreadsheet document as presented on a client device, and wherein the processing system is a server device.

4. The system of claim 1, wherein the instructions, when executed by the processing system, further cause the processing system to:
determine that the currently assigned number of available threads is greater than the updated target number of threads, and in response:
release a thread of the currently assigned number of available threads.

5. The system of claim 4, wherein the release of the thread of the currently assigned number of available threads is delayed until a pause in execution of the recalculation operation.

6. The system of claim 1, wherein execution of the recalculation operation is paused when the currently assigned number of threads is updated to include the additional thread.

7. The system of claim 1, wherein the instructions, when executed by the processing system, further cause the processing system to:
determine that the currently assigned number of available threads is fewer than the updated target number of threads, and in response:
request additional threads for continued execution of the recalculation operation.

8. The system of claim 1, wherein to request the additional thread for execution of the recalculation operation, the processing system is further configured to:
request a number of additional threads, the number based on the currently assigned number of available threads.

9. A method comprising:
receiving an indication that a recalculation operation is to be completed for data stored in a data file;
determining that a currently assigned number of available threads for execution of the recalculation operation is lower than a target number of threads for the recalculation operation, wherein the target number of threads for the recalculation operation is dynamically determined and periodically updated, by:
determining a thread utilization metric for each thread in the currently assigned number of available threads during execution of a current dependency level of the recalculation operation; and
periodically updating the target number of threads for the recalculation operation based on the determined thread utilization metric for each thread in the currently assigned number of available threads;
requesting an additional thread for execution of the recalculation operation;
beginning execution of the recalculation operation using the currently assigned number of available threads;
receiving an indication that the additional thread is available for execution of the recalculation operation;
updating the currently assigned number of available threads to include the additional thread; and
subsequent to the update, continuing execution of the recalculation operation using the updated number of threads.

10. The method of claim 9, wherein the data file is a spreadsheet document and the data stored includes formulas in cells of the spreadsheet document.

11. The method of claim 10, wherein the indication is received at a server device and is based on user input within a cell of the spreadsheet document as presented on a client device.

12. The method of claim 9, wherein execution of the recalculation operation is paused when the currently assigned number of threads is updated to include the additional thread.

13. A non-transitory computer-readable storage medium, the computer-readable storage medium including instructions that when executed by a computer, cause the computer to:
receive an indication that a recalculation operation is to be completed for data stored in a data file;
determine that a currently assigned number of available threads for execution of the recalculation operation is lower than a target number of threads for the recalculation operation, wherein the target number of threads for the recalculation operation is dynamically determined and periodically updated, by:
determining a thread utilization metric for each thread in the currently assigned number of available threads during execution of a current dependency level of the recalculation operation; and
periodically updating the target number of threads for the recalculation operation based on the determined thread utilization metric for each thread in the currently assigned number of available threads;
request an additional thread for execution of the recalculation operation;
begin execution of the recalculation operation using the currently assigned number of available threads;
receive an indication that the additional thread is available for execution of the recalculation operation;
update the currently assigned number of threads to include the additional thread; and
subsequent to the update, continue execution of the recalculation operation using the updated number of threads.

14. The computer-readable storage medium of claim 13, wherein the data file is a spreadsheet document and the data stored includes formulas in cells of the spreadsheet document.

15. The computer-readable storage medium of claim 13, wherein execution of the recalculation operation is paused when the currently assigned number of threads is updated to include the additional thread.

* * * * *